United States Patent [19]

Marchionni et al.

[11] Patent Number: 5,177,226

[45] Date of Patent: Jan. 5, 1993

[54] PERFLUOROPOLYETHERS FREE FROM PEROXIDIC OXYGEN AND CONTAINING PERFLUOROEPOXY GROUPS POSITIONED ALONG THE PERFLUOROPOLYETHER CHAIN, AND THEIR DERIVATIVES

[75] Inventors: Giuseppe Marchionni, Milan; Ugo De Patto, Cogliate; Ezio Strepparola, Treviglio; Gian T. Viola, Cervia, all of Italy

[73] Assignee: Ausimont S.p.A., Milan, Italy

[21] Appl. No.: 712,098

[22] Filed: Jun. 7, 1991

Related U.S. Application Data

[60] Division of Ser. No. 561,251, Jul. 30, 1990, Pat. No. 5,059,700, which is a continuation of Ser. No. 287,168, Dec. 21, 1988, abandoned, which is a division of Ser. No. 45,541, May 4, 1987, Pat. No. 4,853,097.

[51] Int. Cl.$^5$ .......................................... C07D 303/08
[52] U.S. Cl. ................................. 549/550; 549/551; 549/558; 549/561; 549/563
[58] Field of Search .............. 549/550, 551, 558, 561, 549/563

[56] References Cited

U.S. PATENT DOCUMENTS

| | | | |
|---|---|---|---|
| 3,442,942 | 5/1969 | Sianesi et al. | 204/157.89 |
| 3,451,907 | 6/1969 | Sianesi et al. | 204/158 |
| 3,665,041 | 5/1972 | Sianesi et al. | 252/580 |
| 3,699,145 | 10/1972 | Sianesi et al. | 260/463 |
| 3,704,214 | 11/1972 | Sianesi et al. | 204/158 |
| 3,715,378 | 2/1973 | Sianesi et al. | 260/463 |
| 3,810,874 | 5/1974 | Mitsch et al. | 260/75 H |
| 3,847,978 | 11/1974 | Sianesi et al. | 260/535 H |
| 4,664,766 | 5/1987 | Marchionni et al. | 204/157.94 |
| 4,668,357 | 5/1987 | Marchionni et al. | 204/157.94 |
| 4,684,452 | 8/1987 | Marchionni | 204/157.92 |

FOREIGN PATENT DOCUMENTS

| | | |
|---|---|---|
| 089820 | 9/1983 | European Pat. Off. |
| 165649 | 12/1985 | European Pat. Off. |
| 193122 | 9/1986 | European Pat. Off. |

*Primary Examiner*—C. Warren Ivy
*Assistant Examiner*—Ba K. Trinh
*Attorney, Agent, or Firm*—Stevens, Davis, Miller & Mosher

[57] ABSTRACT

Perfluoropolyethers having fluorinated epoxy groups positioned along their perfluoropolyether chain, and free from peroxidic oxygen, are obtained by means of a low-temperature oxidation process, in the liquid phase, with molecular oxygen and in the presence of U.V. light, of a mixture of a perfluorinated monoolefin and a perfluorinated conjugated diene, and of the subsequent photochemical decomposition of the peroxy groups contained in the photoxidation product, carried out by treating the peroxy-groups-containing product with U.V. light at a temperature comprised within the range of from 0° C. to 160° C. Derivatives of said epoxy containing perfluoropolyethers in which the epoxy groups have been turned into functional groups.

2 Claims, No Drawings

PERFLUOROPOLYETHERS FREE FROM PEROXIDIC OXYGEN AND CONTAINING PERFLUOROEPOXY GROUPS POSITIONED ALONG THE PERFLUOROPOLYETHER CHAIN, AND THEIR DERIVATIVES

This is a divisional of application Ser. No. 561,251 filed Jul. 30, 1990, now U.S. Pat. No. 5,059,700, which in turn is a continuation of application Ser. No. 287,168 filed Dec. 21, 1988, now abandoned, which in turn is a divisional of application Ser. No. 045,541 filed May 4, 1987, now U.S. Pat. No. 4,853,097.

BACKGROUND OF THE INVENTION

The present invention relates to perfluoropolyethers having fluorinated epoxy groups positioned along their chain, obtained by starting from a mixture of a perfluoroolefin and a perfluorodiene.

It is known that in low-temperature photooxidation of perfluoroolefins (from $-30°$ C. to $-60°$ C.) with molecular oxygen and in the presence of U.V. light, the primary reaction product is a perfluoropolyether consisting of sequences of oxyperfluoroalkylene units and containing peroxy groups in a variable amount as a function of the reaction conditions. The removal of the peroxy groups in order to obtain stable perfluoropolyethers is carried out by thermal way, by a long heating at a high temperature. See U.S. Pat. Nos. 3,715,378 and 3,665,041.

It is known from U.S. Pat. No. 3,451,907 that perfluorobutadiene, either alone or as a mixture with a perfluoroolefin, when subjected to oxidation with molecular oxygen, at low temperature, in the liquid phase and in the presence of U.V. light, yields photooxidation polymeric products, characterized by the contemporaneous presence of peroxy groups, of fluorinated epoxy groups:

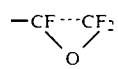

of acidic —COF groups. The complete elimination of the peroxy groups from the photoxidation products, carried out by thermal way according to the known art, consisting in heating at temperatures of at least 200° C. for very long times (some hours) causes, necessarily, the contemporaneous decomposition of the epoxy groups, which are mostly converted into acidic —COF groups.

The Present Invention

Thus, the object of the present invention are novel perfluoropolyethers constituted by sequences of oxyperfluoroalkylene units, characterized by the presence, along their perfluoropolyether chain, of perfluoroepoxy groups

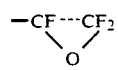

and by the absence of peroxy groups.

These products are obtained by means of the photooxidation of a mixture of a perfluoroolefin and of a perfluorinated conjugated diene and subsequent photochemical decomposition of the peroxy groups, or subsequent specific chemical reduction of the peroxy groups as indicated below.

As perfluorinated olefins used as the starting products, in particular tetrafluoroethylene and perfluoropropene are suitable. As the perfluorinated diene, in particular perfluorobutadiene is suitable.

In case as starting products $C_2F_4$ and $C_4F_6$ are used, a perfluoropolyether having the following structure:

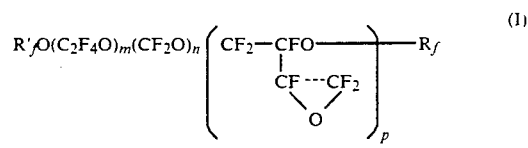

(I)

will be obtained, wherein:

$R_f$ and $R'_f$ are —CF$_2$COF or —CF$_3$ end groups at least one being —CF$_2$COF, when the photochemical decomposition of peroxy groups is used, whereas when chemical reduction of peroxy groups is carried out with HI in alkanol ROH (R=alkyl $C_1$-$C_6$), the groups $R_f$, $R'_f$ are —CF$_2$COOR;

m, n and p are integers different from zero, the m/n ratio is comprised within the range of from 0.5 to 2, the oxyfluoroalkylene units being randomly distributed along the chain.

The $$\frac{m + n}{p}$$

ratio can range from 3 to very high values, even as high as 40. The molecular weight is preferably comprised within the range of from 500 to 15,000. In case $C_3F_6$ and $C_4F_6$ are used, a perfluoropolyether of formula:

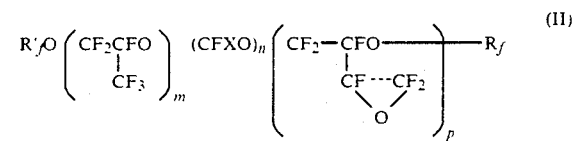

(II)

will be obtained, wherein

X=F or CF$_3$, m, n and p are integers different from zero, $R'_f$ and $R_f$ indicate the end groups above specified. The m/n ratio is comprised within the range of from 5 to 40, and the m/p ratio is comprised within the range of from 2 to 50. The molecular weight is preferably comprised within the range of from 500 to 8,000.

If desired, also perfluoropolyethers can be prepared, which contain mixtures of a plurality of perfluoroolefins for example $C_2F_4 + C_3F_6$, and one or more conjugated dienes.

The first step of the process consists in the photooxidation, which is substantially carried out according to the known art. The perfluoroolefin + perfluorodiene mixture is dissolved in a suitable inert solvent, in particular a chlorofluoro carbon such as $CCl_2F_2$; the oxidation is carried out with molecular oxygen in the gas state, at temperatures of from $-80°$ C. to $+50°$ C., preferably of from $-60°$ C. to $0°$ C., and in the presence of U.V. light. The photooxydation product contains peroxy groups and perfluoroepoxy groups.

We have surprisingly found that the peroxy groups can be eliminated, and the epoxy groups being left unaltered, by carrying out a phtochemical decomposition of said peroxy groups, at a controlled temperature. Suitable conditions for obtaining a product free from peroxy groups, and maintaining unchanged epoxy groups are the use of U.V. light at a wavelength of 248-334 nm, and of temperatures of from 0° C. to 150° C., preferably of from 20° C. to 50° C.

It is also possible to eliminate the peroxy groups through chemical reduction which leaves unaltered the epoxy groups, for example by reacting with HI in alkanol ROH (R=alkyl $C_1$-$C_6$).

The epoxy groups frequence in the perfluoropolyether chain is proportional to the diene/monoolefin ratio in the starting mixture.

As diolefins besides perfluorobutadiene, also perfluoroisoprene can be mentioned.

Further object of the invention is the preparation of dibromoderivatives wherein $R_f$ and $R'_f$ are —$CF_2Br$.

These compounds are obtained by reacting with bromine in the presence of U.V. radiations at about 100° C., the photochemical oxidation product containing peroxy and epoxy groups; the bromine is introduced at the place of peroxy groups as described in the Europ. patent 145,946 whereas the epoxy groups remain unchanged.

Further object of the invention is the preparation of derivatives of the products above defined obtained by conversion of the epoxy groups and/or of the end groups $R_f$ and $R'_f$ in order to obtain polyfunctional derivatives. The derivatives obtained through the conversion of both end groups $R_f$ and $R'_f$ and also epoxy groups can show all the functional groups of the same type when the epoxy groups are previously converted into

or —COOR respectively

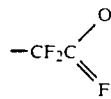

and —$CF_2$ COOR (R=alkyl $C_1$-$C_6$). Otherwise the functional groups derived from $R_f$ and $R'_f$ are generally different from those derived from epoxy groups.

Said functional groups are those suitable to give polymers by polycondensation or by polyaddition reactions or to act as cross-linking agents for resins or polymeric materials. The polymeric products thus obtained are characterized by the following properties:
high thermal stability,
low transition temperature of the second order,
hydro- and oleo-repellent,
low refraction index.

As more interesting functional groups, obtainable through well known reactions, we can mention the following:
—CONHR (R=H or alkyl $C_1$-$C_{12}$, or cycloalkyl)
—CN —CHR'OH (R'=H or —$CF_3$) —$CH_2NH_2$ From the above main functional groups it is possible to obtain many other functional groups through known reactions for example the functional groups described in U.S. Pat. Nos. 3,810,874; 3,847,978; Eur. pat. 165,649 and 165,650 thus obtaining products having the same uses and characterized by the properties above mentioned for the polymeric derivatives and also by good lubricant characteristics.

It is possible to convert the epoxy group without modification of the end groups $R_f$ and $R'_f$, for example through the following reactions.
a) Conversion of the epoxy group into a

group by thermal treatment at 180°-200° C. with elimination of $CF_2$ for each epoxy group as gaseous byproduct (in form of $C_2F_4$; $C_3F_6$ or higher fluoroolefin) according to the scheme:

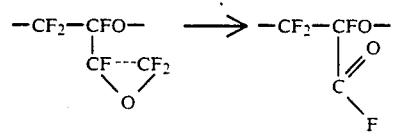

Starting products can be those of formula I and II with any value (also —$CF_2Br$) for $R_f$ and $R'_f$.
b) Conversion of the epoxy group

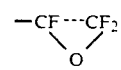

into a

group by treatment at 50° C. with KF in aprotic polar solvent such as diglyme. Starting products can be those of formula I and II with any value (also —$CF_2Br$) for $R_f$ and $R'_f$.
c) Conversion of the epoxy group

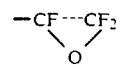

into a

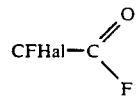

(Hal=halogen different from F) through reaction with a Grignard reagent RMgHal in stoichiometric amount. Starting compounds: those of formula I and II wherein $R_f$ and $R'_f$ are —$CF_2COOR$.
All the groups

present as $R_f$ and $R'_f$ or derived from conversion of epoxy groups according to the reactions a), b) and c) can be easily converted into ester group —COOR by reacting with alkanol ROH (R=alkyl $C_1$-$C_3$). These ester groups are suitable for many further reactions and at the same time do not have some drawbacks of the free acylfluoride group.

d) Conversion of the epoxy group

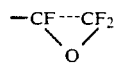

into the keto group —COCF$_3$, in the starting compounds of formula I and II wherein $R_f$ and $R'_f$ are —CF$_2$COOR. The reaction is carried out by heating at 100° C. in the presence of AlF$_3$. A subsequent interesting reaction of this keto group is the reduction of the same with H$_2$ (catalyst Pd on carbon) with conversion into the group —CHOHCF$_3$, whereas the end groups —CF$_2$COOR remain unchanged. The hydroxy group —OH thus introduced along the perfluoroetheral chain, can be utilized for crosslinking reactions with suitable crosslinking agents (for example diepoxides, diisocyanate, and so on).

e) A further reaction of the epoxy groups of compounds of formula I and II wherein $R_f$ and $R'_f$ are —CF$_2$Br or —CF$_2$COOR, is their polymerization in presence of CsF or of tetramethyl urea, in polar aprotic solvent. The obtained polymer, having a perfluoropolyethereal structure, are of linear or crosslinked type and can contain a high number of reactive groups —CF$_2$COOR or —CF$_2$Br. The groups

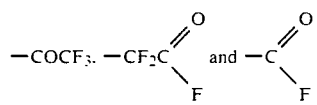

obtained through the conversion of the epoxy groups as above shown, can be further converted in perfluorovinylether groups, which are suitable for the preparation of addition polymers containing the end groups $R_f$ and $R'_f$ of the type —CF$_2$Br or —CF$_2$COOR. The conversion occurs through the addition of alkali fluoride CaF and/or KF and subsequent addition of

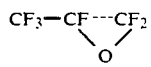

in polar aprotic solvent, thus obtaining an acyl fluoride derivative which in the presence of basic substances, at 120°-220° C., gives the perfluorovinylether derivative.

As above said starting compounds are those of formula I or II having $R_f$ and $R'_f$ equal to —CF$_2$Br or —CF$_2$COOR and wherein the epoxy groups have been previously converted into

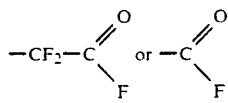

acyl fluoride groups. The perfluorovinyl ethers thus obtained are characterized respectively by the group —CF$_2$CF$_2$OCF=CF$_2$ or —CF$_2$OCF=CF$_2$.

f) Another interesting conversion of the epoxy groups is that into —Br according to the scheme:

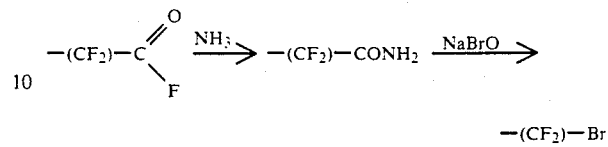

$$—(CF_2)—Br$$

As already said polyfunctional perfluoropolyethers of the invention can be employed for preparing crosslinked polymers, or as crosslinking agents of polycondensation polymers.

Linear polymers can be obtained by nucleophilic polymerization of the epoxy group, from the compounds of formula I and/or II having only one epoxy group for each perfluoroethereal chain.

These linear polymers can be used as liquid membrane having many applications depending on the kind of the functional groups on the sides of the polymeric chain (for instance —COOH or SO$_3$H having ion exchange properties).

In general the compounds of formula I and II or their derivatives can be used as coatings, topic lubrication and boundery lubrication.

The following examples are given as illustrative and not limitative embodiments of the invention.

EXAMPLE 1

A) Preparation of the peroxy compound

A 600 ml photochemical reactor is used, with an optical path of 0.5 mm, equipped with a reflux condenser kept at the temperature of $-80°$ C., a sheath with thermocouple for temperature detecting. The reactor is equipped with a system of FC 75 ®-cooled quartz sheats for the insertion of the U.V. lamp (HANAU type TQ 150) wavelength comprised within the range of from 248 to 334 nm).

To the reactor, after cooling by dry ice-acetone bath, 460 ml of CF$_2$Cl$_2$ is charged; then the reactor being maintained at $-50°$ C., to it, over 4.3 hours, 96 g (3.0 mol) of O$_2$, 100 g (1.0 mol) of C$_2$F$_4$ and 14.1 g (0.087 mol) of C$_4$F$_6$ are charged. The gases entering the reactor are passed through a CaCl$_2$-trap. At the end, the solvent is evaporated off, and 46 g of oil is obtained. The produced oil results to contain 3.96% of active (peroxy) oxygen by weight. On the basis of this data, of the $^{19}$F-N.M.R. spectrum and of the I.R. spectrum, the structure of this compound can be represented by a sequence of —CF$_2$—, —CF$_2$—CF$_2$— units linked by ether and/or peroxy bridges and by

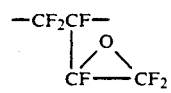

units only connected by ether bridges. The product, which has a viscosity of 4300 cSt at 20° C., has a molecular weight (as determined by G.P.C. and confirmed by N.M.R.) of 7200. The epoxy content (computed by $^{19}$F-N.M.R.) is of 2.7 units per polymeric chain.

B) Preparation of the compound with zero oxidizing power 23 g of product obtained from photosynthesis is dissolved in 230 ml of $CFCl_2CF_2Cl$ and is charged to a 300-ml reactor with an optical path of 0.5 mm, equipped with a reflux condenser maintained at a temperature of $-10°$ C. and with a sheath with thermocouple for temperature detecting. The system is provided with FC 75 ®-cooled quartz sheats for the insertion of the U.V. lamp (HANAU type TQ 150) (FC 75 ®) is a 3M fluorocarbon). The photoreduction reaction is carried out at the temperature of $30°$ C. for a time of 30 hours. At reaction end, from reactor 13.9 g is recovered of a product which, at the iodometric analysis, results to have a zero content of (peroxy) active oxygen. On the basis of the $^{19}F$-N.M.R. spectrum and of the I.R. spectrum, the structure of this product is represented by a sequence of $-CF_2O-, -CF_2-CF_2O-$,

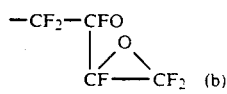

units, and end groups of $-CF_2COF$ type. The molar ratio of possible $-CF-$ groups inside the chain to the (b) $-CF_2-$ moieties of the epoxy group remains constant. In fact, the $^{19}F$-N.M.R. does not detect the presence of groups of

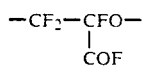

type inside the chain. The molecular weight of the product results to be 5,400. The content of in-chain epoxy groups after the photoreduction results of 2.65 units per polymer chain.

EXAMPLE 1A (COMPARISON EXAMPLE)

An aliquot of an oil O.P. (oxidizing power)=3.96% by weight, obtained in step A of Example 1, was submitted to a thermal treatment to the purpose of reducing its oxidizing power. 20 g of polymer is charged to a 50-cc flask equipped with thermometer and stirrer; over a 2-hour time the temperature is increased to $230°$ C., the reaction mass is then kept for a further 6 hours at $230°-240°$ C. At the end, 12.1 g is unloaded of a product which, at the iodometric analysis, results to have a zero O.P. The $^{19}F$-N.M.R. spectrum does not evidence the presence of epoxy groups, but the typical peaks appear of

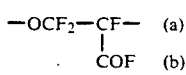

group.

$[\delta (b) = +26.4; \delta (a) = -130, -131.5]$.

EXAMPLE 1B (COMPARISON EXAMPLE)

A portion of an oil having O.P.=3.96% by weight, obtained as per step A of Example 1, was submitted to a thermal treatment. 20 g of the oil is charged to a 50-cc flask equipped with thermometer and stirrer; the flask is placed inside a heating bath, and the whole is kept at a constant temperature of $160°$ C. 52 hours later, the product results to have an O.P. of 2.7% by weight and an epoxy content of 80% of initial epoxy content, as determined via N.M.R. analysis.

EXAMPLE 2

A) Preparation of the peroxy compound

To the same equipment as of Example 1, 460 ml of $CF_2Cl_2$ is charged; then, with the equipment being maintained at $-47°$ C., to it, over 6 hours, 101.2 g (3.16 mol) of $O_2$, 74.6 g (0.74 mol) of $C_2F_4$ and 25.4 g (0.16 mol) of $C_4F_6$ are charged. At reaction end, the solvent is evaporated off, and 59.8 g of oil is obtained. The oil obtained according to this process has a content 3.64% of active oxygen by weight. On the basis of this data, of the $^{19}F$-N.M.R. spectrum and of the I.R. spectrum, the structure of this compound results to be composed by the same repetitive units as evidenced in the product of Example 1. The epoxy content (as computed by $^{19}F$-N.M.R.) is of 10.4 units per polymer chain, the molecular weight of which is 7,500.

B) Preparation of zero-O.P. compound 25 g of the peroxidic product coming from the photosynthesis is dissolved in 230 ml of $CF_2ClCFCl_2$ and is charged to a 300-ml reactor as already described in Example 1. The photoreduction is carried out at the temperature of $30°$ C. for an overall time of 28 hours. At reaction end, from the reactor 15.9 g is recovered of a product having zero oxidizing power. The analysis of this product shows the presence of structures of $-CF_2O-$, $-CF_2-CF_2O-$,

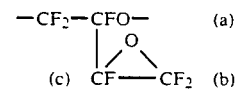

type, and of end groups of $-CF_2COF$ type. The $^{19}F$-N.M.R. $[\delta (b) = -110, -113; \delta (a) = -132.8, -136.5; \delta (c) = -147.7]$ and I.R. analyses

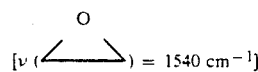

confirm the stability of the epoxide during this treatment. The molecular weight of the product results to be 6200.

EXAMPLE 2A (COMPARISON EXAMPLE)

In a similar way as of Example 1, 20 g of oil with O.P.=3.64% by weight, obtained in step A of Example 2, is treated. Over a 2-hour time, the temperature is increased to $230°$ C., and is maintained for more than 6 hours at $230°-240°$ C. At the end, 12.7 g of product with zero O.P. is discharged. The $^{19}F$-N.M.R. spectrum shows the presence of the

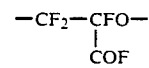

group in lieu of the epoxy group

EXAMPLE 3

A) Preparation of the peroxy compound

To the same equipment as described in Example 1, 460 ml of $CF_2Cl_2$ is charged. To the reactor, maintained at −40° C. and under U.V. light, during 4.4 hours 95.6 g (3 mol) of $O_2$, 117.2 g (1.17 mol) of $C_2F_4$ and 9.4 g (0.058 mol) of $C_4F_6$ are then charged. At the end, the solvent is evaporated off, and 40.2 g of oily product is obtained. This oil is a polymer containing 3.17% of active oxygen by weight. The structure, as determined by $^{19}F$-N.M.R. and I.R., results to be a sequence composed by the same structural units as evidenced in the product of Example 1, with the presence of —$CF_3$ and —$CF_2COF$ end groups in the ratio of 0.5:1. The product has a viscosity of 3,000 cSt, and a molecular weight of 5,700. Its content of epoxy groups is of 2.1 units per chain.

B) Preparation of zero-O.P. compound 20 g of peroxidic product, coming from the photosynthesis, is dissolved in 230 ml of $CF_2ClCFCl_2$ and is charged to a 300-ml photochemical reactor as already described in Example 1. The photoreduction reaction is carried out at the temperature of 30° C. for an overall time of 28 hours. At reaction end, from the reaction 13.7 g is recovered of a product having zero oxidizing power. The analysis of this product shows the presence of structures of —$CF_2O$—, —$CF_2$—$CF_2O$—, $$-CF_2-CFO- \atop {|\diagup O \diagdown \atop CF-\!\!-\!\!-CF_2}$$

type, and of end groups of —$CF_2COF$ and —$CF_3$ type. Said end groups are in the above-indicated ratio to each other. The molecular weight of the product is 4,250.

EXAMPLE 3A (COMPARISON EXAMPLE)

In an analogous way to Example 1, 15 g of an oil with O.P.=3.17% by weight, obtained by photosynthesis, is treated. The reaction mass is heated to 230° C. during a 2-hour time, and is kept at 230°-240° C. for a further 6 hours. At the end, 10.2 g of a non-peroxidic product is obtained. The analyses show the disappearance of the epoxy groups and the appearance of the

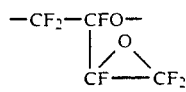

group

EXAMPLE 4

100 g of the product obtained in Example 2A were additioned by dripping to a mixture of 20 ml of aqueous HF 57%, of 50 ml of $CH_3OH$ and of 150 ml of 1,1,2-trifluoro-trichloroethane. The reaction mixture is kept at the boiling temperature for 8 hours. The reaction mixture is poured into iced water, the heavy liquid phase is separated and then washed with mixture methanol/hydrochloric acid (36%) in ratio 1/1 by w. The heavy liquid is then dried on $Na_2SO_4$ and subsequently the chlorofluorocarbon solvent is distilled off. As a residue there are left 82 g of an oily substance which shows in I.R. analysis specific bands of the ester group (1800 cm$^{-1}$) and in N.M.R. a ratio m/n=0.9. An average molecular weight of 730 is determined whereas the acidic equivalent weight is 355. The structure of the compound corresponds to the formula I wherein p=1.

EXAMPLE 5

10 g of the product obtained in example 4, were charged in a glass flask of 50 ml.

1 g of α-$AlF_3$ was added. The mixture was heated to 100° C. and stirred.

After 8 hours of reaction the resulting mixture was cooled, filtered, and the reaction product was completely recovered.

The NMR analysis showed the presence of

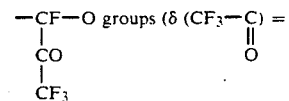

−75 ppm with respect to CF—$CF_3$)

and the complete absence of epoxy groups.

EXAMPLE 6

0.3 g of anhydrous KF were dispersed in 50 ml of tiglyme (diethylenglycoldimethylether $CH_3OCH_2CH_2OCH_2CH_2OCH_3$) in a glass flask of 100 ml.

20 g of the product obtained in Example 4 were added to this dispersion at 50° C. drop by drop. The mixture was stirred for 4 hours, then it was cooled and filtered.

The diglyme was then separated by distillation under vacuum; the remaining product showed, under NMR analysis of $^{19}F$, that the epoxy group was completely disappeared and that the group —$CF_2$—COF was present.

The product thus obtained, treated with methanol, was converted to the corresponding triester, having acidimetric equivalent weight of 240 and the following formula:

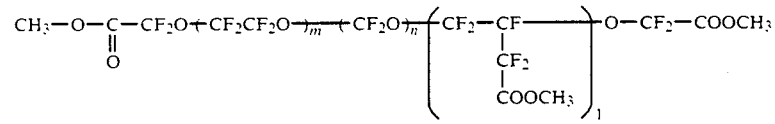

EXAMPLE 7

50 g of the product prepared according to Example 5 were added, at room temperature, to a suspension of 4.5 g of anhydrous KF in 150 ml of anhydrous diglyme in an anhydrous atmosphere; the mixture was stirred for 2 hours. During this period the solid (KF) almost completely disappeared.

20 of hexafluoropropene epoxide were then bubbled into the mixture.

Immediately a salt precipitated, the amount of which increased with the amount of the added epoxide.

The mixture was degassed from the excess of perfluoropropene epoxide, was filtered in anhydrous atmosphere; the heaviest phase was separated and, after the removal of diglyme, it showed under I.R. analysis, the band of acyl fluoride

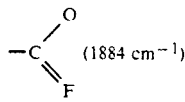

and the absence of the ketone band (1803 cm$^{-1}$). The product thus obtained was treated twice with an excess of anhydrous $Na_2CO_3$, in diglyme, at 80° C. for 60 minutes and at 120°-140° C. for further 60 minutes.

The filtered and separated product showed the typical I.R. band of perfluorovinylethers (1840 cm$^{-1}$) and the ester band at 1800 cm$^{-1}$.

The NMR analysis confirmed the following structure:

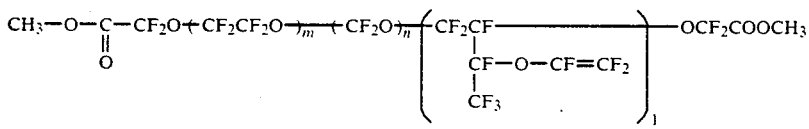

EXAMPLE 8

50 g of the triester obtained according to Example 6 were added, drop by drop during 1 hour, in a mixture of 16 g of $LiAlH_4$ in 500 ml of anhydrous ethyl ether, kept under reflux in a 4-neck flask having the capacity of 1 l.

After 4 hours of reaction, 15 ml of $H_2O$ dissolved in 60 ml of tetrahydrofuran were added in order to decompose the excess of $LiAlH_4$.

After a 2-hours stirring 150 ml of a mixture of aqueous HCl (33%)+$H_2O$ in the volume ratio ¼ were added.

The ether phase was then separated and dehydrated over $Na_2SO_4$; the ethyl ether was then distilled, leaving a liquid product characterized by a high I.R. absorbance in the —OH zone, having no absorption in the

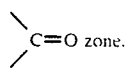

By acetylation a hydroxy equivalent weight of 225 was measured.

The NMR analysis of $^1H$ showed the presence of methylene groups $CH_2$ between —$CF_2$ and —OH (at about 4 ppm), therefore corresponding to the formula:

$$HOCH_2-CF_2O+CF_2CF_2O \overline{)_m} +CF_2O \overline{)_n} \left( \begin{array}{c} CF_2CF \\ | \\ CF_2 \\ | \\ CH_2OH \end{array} \right)_l OCF_2CH_2OH$$

The NMR $^{19}F$ analysis confirmed this structure.

EXAMPLE 9

50 g of the triester obtained according to example 6 were dissolved in 100 ml of 1,1,2-trichloro-1,2,2-trifluoroethane.

10 g of isobutylamine were added at room temperature during 1 hour.

A sample was drawn after 1 hour and was dried from the solvent; the remaining product, under I.R. analysis, showed a certain adsorbance due to ester group (1800 cm$^{-1}$) together with the band of amidic group (1712 cm$^{-1}$).

The presence of an excess of isobutylamine was confirmed and therefore the reaction was carried out for further 3 hours.

After this time the product did not show any traces of I.R. adsorption due to the ester group.

A viscous oil was then separated after the removal of the solvent and of the excess amine.

A treatment at 150°-170° C. for 3-5 hours with an excess of $P_2O_5$ and successive separation of polyphosphoric acid permit to observe an I.R. adsorption characteristic of CN group at 2277 cm$^{-1}$ and the disappearance of the band due to amide group.

EXAMPLE 10

In a 500-ml photochemical reactor, having an optical path of 0.5 cm, equipped with a coaxial quartz sheath for the insertion of a Hg-vapour lamp (HANAU type TQ 150) and with a magnetic stirrer, a reflux condenser, a $CO_2$ trap and a system for the control of the temperature both of the reactor and the sheath, 400 g of a product obtained according to Example 2A were loaded.

10 g of bromine were successively added and the system was heated to 100° C.

After switching on the lamp, 50 g of bromine were added during the 15 hours of the test.

At the end the reaction mass was poured into a flask and the bromine was distilled under vacuum.

300 g of a product having an average molecular weight of 700 and nearly no oxidating ability were obtained, said product having —$CF_2Br$ end groups in an amount of 2 brominated end groups for 1 perfluoropolyether chain, and having one epoxy group $$-CF-CF_2$$
$$\diagdown O \diagup$$

in each chain.

What we claim is:

1. A perfluoropolyether free of peroxidic oxygen prepared by the photooxidation of $C_3$-$C_4$ perfluoroolefins and perfluoro-butadiene or perfluoro-isoprene having the following formula:

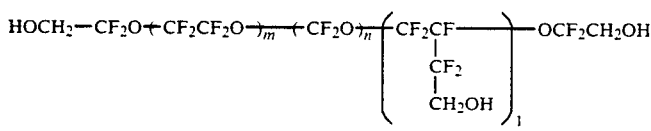

wherein:

$R_f$ and $R'_f$ are —$CF_2COF$ or —$CF_3$ end groups at least one being —$CF_2COF$, or groups $R_f$, $R'_f$ are —$CF_2COOR$, or $CF_2Br$, $X = F$ or $CF_3$, m, n and p are integers different from zero, the ratio m/n is within the range of from 5 to 40, and the m/p ratio is in the range of from 2 to 50.

2. A polyfunctional derivative of a perfluoropolyether free of peroxidic oxygen prepared by the photooxidation of $C_2$-$C_4$ perfluoroolefins and perfluoro-butadiene or perfluoroisoprene having the following formulae:

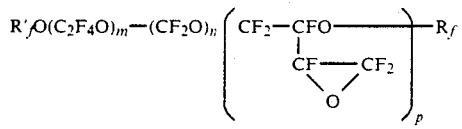

wherein the end groups $R_f$ and $R'_f$ are initially —$CF_2COF$ or —$CF_3$, at least one being —$CF_2COF$, or end groups $R_f$ and $R'_f$ are initially —$CF_2COOR$, or —$CF_2Br$; m, n and p are integers different from zero, the m/n ratio is within the range of from 0.5 to 2, the oxyfluoroalkylene units being randomly distributed along the chain; m+n/p is from 3 to 40, or

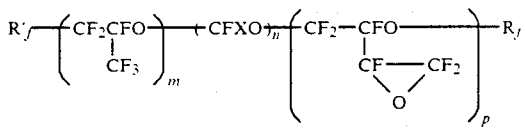

wherein $R_f$ and $R'_f$ have the same meaning as above, $X = F$ or $CF_3$, m, n and p are integers different from zero, the m/n ratio is within the range of from 5 to 40, and the m/p ratio is within the range of from 2 to 50, and wherein at least one of said initial end groups, or epoxy groups along the chain, is converted to a functional group selected from the group consisting of —CONHR, wherein R=H or $C_1$-$C_{12}$ alkyl, or cycloalyl;
—CN;
—CHR'OH, wherein R'=H or —$CF_3$;
—$CH_2NH_2$;
—$CF_2OCF=CF_2$; and
—$CF_2CF_2$—O—$CF=CF_2$.

* * * * *